(12) United States Patent
Lacher et al.

(10) Patent No.: US 10,227,998 B2
(45) Date of Patent: Mar. 12, 2019

(54) SYSTEM FOR CONTROLLING THE SUPPLY OF HYDRAULIC FLUID TO A WORK VEHICLE IMPLEMENT

(71) Applicant: CNH Industrial America, LLC, New Holland, PA (US)

(72) Inventors: Jonathan Lacher, Fargo, ND (US); Michael Freisleben, Homer Glen, IL (US); Jerry L. Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/985,647

(22) Filed: Dec. 31, 2015

(65) Prior Publication Data

US 2017/0191506 A1    Jul. 6, 2017

(51) Int. Cl.
  *F15B 11/028*  (2006.01)
  *F15B 11/08*   (2006.01)
  (Continued)

(52) U.S. Cl.
  CPC ............ *F15B 11/028* (2013.01); *A01C 7/205* (2013.01); *F15B 11/02* (2013.01); *F15B 11/05* (2013.01); *F15B 11/055* (2013.01); *F15B 11/08* (2013.01); *F15B 13/0401* (2013.01); *F15B 13/044* (2013.01); *F15B 13/0417* (2013.01);
  (Continued)

(58) Field of Classification Search
  CPC .......... F15B 11/028; F15B 2211/50554; F15B 2211/5155; F15B 2211/5158; F15B 2211/3127; F15B 2211/7741; E02F 3/433; E02F 3/436
  See application file for complete search history.

(56) References Cited

U.S. PATENT DOCUMENTS

| 4,024,710 | A | | 5/1977 | Zelle |
| 4,883,091 | A | | 11/1989 | Weiler et al. |
| 5,826,666 | A | * | 10/1998 | Tozawa ................... E02F 3/437 172/2 |
| 5,988,770 | A | | 11/1999 | Volz |
| 6,460,623 | B1 | * | 10/2002 | Knussman ............. A01B 63/11 111/926 |
| 6,745,634 | B2 | | 6/2004 | Beck et al. |

(Continued)

FOREIGN PATENT DOCUMENTS

EP        2377384 A1    10/2011

OTHER PUBLICATIONS

European Search Report for European Application No. 16203985.3 dated Jun. 7, 2017 (15 pages).

*Primary Examiner* — F. Daniel Lopez
*Assistant Examiner* — Michael Quandt
(74) *Attorney, Agent, or Firm* — Rickard K. DeMille; Rebecca L. Henkel

(57) ABSTRACT

In one aspect, a system for controlling the supply of hydraulic fluid to an implement of a work vehicle may generally include a pump, a control valve coupled to the pump and first and second fluid lines provided in flow communication with output ports of the control valve. The system may also include a pressure control valve provided in flow communication with the second fluid line that is configured to regulate a fluid pressure of the hydraulic fluid being supplied to a hydraulic cylinder of the implement. Additionally, the system may include a bypass fluid line configured to provide a flow path for hydraulic fluid between the pump and the second fluid line that is independent of the control valve and a load sensing line configured to provide an indication of the fluid pressure of the hydraulic fluid being supplied to the hydraulic cylinder.

13 Claims, 4 Drawing Sheets

(51) Int. Cl.
  *F15B 13/04* (2006.01)
  *F15B 13/044* (2006.01)
  *A01C 7/20* (2006.01)
  *F15B 11/02* (2006.01)
  *F15B 11/05* (2006.01)
  *A01B 63/10* (2006.01)

(52) U.S. Cl.
  CPC ........... *A01B 63/10* (2013.01); *A01B 63/1013* (2013.01); *F15B 2211/20538* (2013.01); *F15B 2211/20546* (2013.01); *F15B 2211/25* (2013.01); *F15B 2211/253* (2013.01); *F15B 2211/3127* (2013.01); *F15B 2211/3144* (2013.01); *F15B 2211/329* (2013.01); *F15B 2211/50554* (2013.01); *F15B 2211/7128* (2013.01); *F15B 2211/7741* (2013.01)

(56) References Cited

U.S. PATENT DOCUMENTS

| | | | |
|---|---|---|---|
| 6,802,791 | B1 | 10/2004 | Yoshioka |
| 6,990,999 | B2 | 1/2006 | Patel |
| 7,918,285 | B1 * | 4/2011 | Graham .............. A01B 63/1006 172/2 |
| 8,056,465 | B2 * | 11/2011 | Carlz .................... A01C 7/205 91/31 |
| 8,202,197 | B2 | 6/2012 | Ogata et al. |
| 8,573,111 | B2 * | 11/2013 | Graham .............. A01B 63/1013 60/445 |
| 8,613,295 | B2 | 12/2013 | Huang |
| 8,800,600 | B2 | 8/2014 | Huang |
| 2011/0202232 | A1 * | 8/2011 | Busch ................... A01B 63/00 701/36 |
| 2015/0167276 | A1 | 6/2015 | Brinkley et al. |

* cited by examiner

SYSTEM FOR CONTROLLING THE SUPPLY OF HYDRAULIC FLUID TO A WORK VEHICLE IMPLEMENT

FIELD OF THE INVENTION

The present subject matter relates generally to work vehicles and, more particularly, to a system for controlling the supply of hydraulic fluid to an implement of a work vehicle, particularly when the implement is being operated in a constant down pressure mode.

BACKGROUND OF THE INVENTION

Work vehicles, such as tractors and other agricultural vehicles, include a hydraulic system configured to control the supply of hydraulic fluid to various on-board hydraulic components and/or various auxiliary hydraulic components, such as one or more hydraulic motors and/or cylinders included within an implement being towed by the vehicle. Conventional hydraulic systems utilize pressure-compensated flow control valve sections to modulate the flow of hydraulic fluid to the various auxiliary hydraulic components. In these conventional systems, a pump is configured to supply pressurized fluid to a flow control valve that regulates the flow of hydraulic fluid to a given hydraulic component. The load sensed at the flow control valve is then used to adjust the output pressure of the pump.

Such conventional hydraulic systems are capable of operating quite efficiently when supplying hydraulic fluid to auxiliary hydraulic components that do not require pressure control. However, when supplying hydraulic fluid to auxiliary hydraulic components that do require pressure control, conventional hydraulic systems have certain disadvantages. For example, many implements, such as planters and seeders, include a pressure regulating valve for adjusting the pressure of the hydraulic fluid supplied to the implement from the vehicle's hydraulic system to allow the implement to be operated in a constant down pressure mode. Such pressure control on the implement often results in the vehicle's hydraulic system not operating properly. Specifically, since the pump is operated based on the load sensed at the flow control valve, the vehicle's hydraulic system is unable to adapt to the downstream pressure control. This leads to the pump being operated at a significantly reduced efficiency and also leads to excessive heat generation. For example, since the flow control valve in a conventional hydraulic system is configured to provide a constant flow rate, the pump is often driven up to its maximum pressure output in an attempt to maintain such flow rate in instances when the auxiliary hydraulic component(s) requires a lesser flow rate due to the downstream pressure control.

Accordingly, an improved system for controlling the supply of hydraulic fluid to an implement of a work vehicle when such implement includes one or more hydraulic components that utilize pressure control when operating in one or more modes would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the supply of hydraulic fluid to an implement of a work vehicle, wherein the implement includes a hydraulic cylinder having a first chamber and a second chamber. The system may generally include a pump configured to provide hydraulic fluid under pressure through a pump output line and a control valve in flow communication with the pump output line. The control valve may be configured to regulate a supply of hydraulic fluid to the hydraulic cylinder. The system may also include a first fluid line provided in flow communication with a first output port of the control valve and a second fluid line provided in flow communication with a second output port of the control valve. The control valve may be configured to supply hydraulic fluid through the first fluid line to the first chamber of the hydraulic cylinder for raising at least one ground-engaging component of the implement relative to the ground and may be configured to supply hydraulic fluid through the second fluid line to the second chamber of the hydraulic cylinder for lowering the ground-engaging component(s) relative to the ground. Additionally, the system may include a pressure control valve provided in flow communication with the second fluid line. The pressure control valve may be configured to regulate a fluid pressure of the hydraulic fluid being supplied to the second chamber of the hydraulic cylinder. Moreover, the system may include a bypass fluid line configured to provide a flow path for hydraulic fluid between the pump and the second fluid line that is independent of the control valve and a load sensing line configured to provide an indication of the fluid pressure of the hydraulic fluid being supplied to the second chamber of the hydraulic cylinder from the pressure control valve. When hydraulic fluid is being supplied through the pressure control valve from the pump, operation of the pump may be controlled based at least in part on the fluid pressure of the hydraulic fluid being supplied to the second chamber of the hydraulic cylinder.

In another aspect, the present subject matter is directed to a system for controlling the supply of hydraulic fluid to an implement of a work vehicle, wherein the implement includes a hydraulic cylinder having a first chamber and a second chamber. The system may generally include a pump configured to provide hydraulic fluid under pressure through a pump output line and a control valve in flow communication with the pump output line. The control valve may be configured to regulate a supply of hydraulic fluid to the hydraulic cylinder. The system may also include a first fluid line provided in flow communication with a first output port of the control valve and a second fluid line provided in flow communication with a second output port of the control valve. The control valve may be configured to supply hydraulic fluid through the first fluid line to the first chamber of the hydraulic cylinder for raising at least one ground-engaging component of the implement relative to the ground and may be configured to supply hydraulic fluid through the second fluid line to the second chamber of the hydraulic cylinder for lowering the ground-engaging component(s) relative to the ground. Additionally, the system may include a pressure control valve provided in flow communication with the second fluid line. The pressure control valve may be configured to regulate a fluid pressure of the hydraulic fluid being supplied to the second chamber of the hydraulic cylinder. Moreover, the system may include a bypass fluid line configured to provide a flow path for hydraulic fluid between the pump and the second fluid line that is independent of the control valve and a bypass valve provided in flow communication with the bypass fluid line. The bypass valve may be configured to cut-off the flow path defined by the bypass fluid line when hydraulic fluid is being supplied from the control valve through the first fluid line to raise the at least one ground-engaging component relative to the ground.

In a further aspect, the present subject matter is directed to a system for controlling the supply of hydraulic fluid to an implement of a work vehicle, wherein the implement includes a hydraulic cylinder having a first chamber and a second chamber. The system may generally include a control valve configured to regulate a supply of hydraulic fluid to the hydraulic cylinder and first and second fluid lines provided in flow communication with first and second output ports, respectively, of the control valve. The control valve may be configured to supply hydraulic fluid through the first fluid line to the first chamber of the hydraulic cylinder for raising at least one ground-engaging component of the implement relative to the ground and may be configured to supply hydraulic fluid through the second fluid line to the second chamber of the hydraulic cylinder for lowering the ground-engaging component(s) relative to the ground. The system may also include a pressure sensor configured to provide an indication of an input pressure of the hydraulic fluid being supplied to the second chamber of the hydraulic cylinder. Additionally, the system may include a controller communicatively coupled to the pressure sensor. The controller may store a pressure setting associated with an operator-selected pressure value for the hydraulic fluid being supplied to the second chamber of the hydraulic cylinder. The controller may be configured to actively adjust the operation of the control valve based on pressure measurements received from the pressure sensor such that the input pressure of the hydraulic fluid is equal to or greater than the operator-selected pressure value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
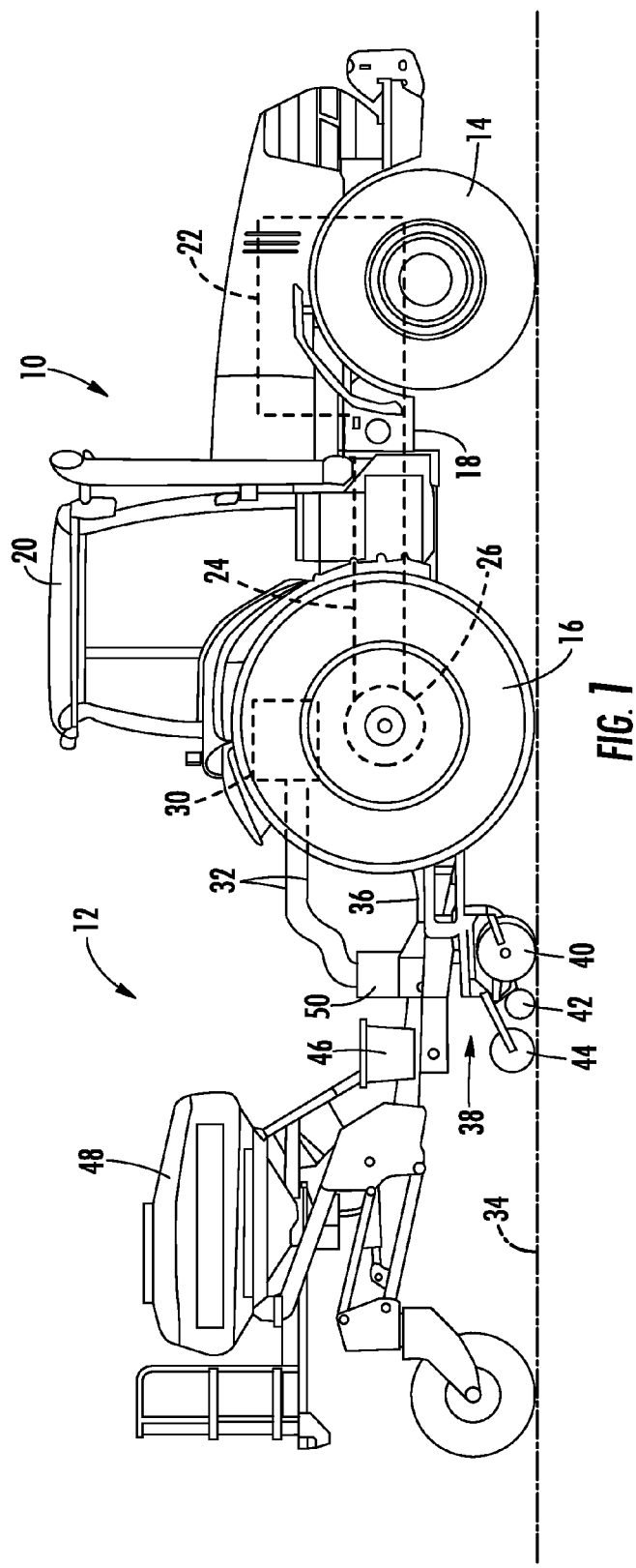
FIG. 1 illustrates a side view of one embodiment of a work vehicle towing an implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved system for controlling the supply of hydraulic fluid to a work vehicle implement. Specifically, in several embodiments, the system may be configured to allow for an implement to be operated within a constant down pressure mode while avoiding the system inefficiencies and excessive heat generation typically experienced by conventional hydraulic systems. For example, as will be described below, the system may include a loading sensing line configured to provide an indication of the output pressure of a pressure control device (e.g., a pressure regulating valve) located downstream of a flow control valve of the system. As such, unlike conventional systems that sense the load at the flow control valve, the disclosed system may allow for pump control based on the downstream system pressure, which may permit the flow through the control valve to be driven as a function of the load or restriction to which the control valve is connected. Thus, the system efficiency may be significantly improved. Moreover, given the downstream load sensing, heat generation may also be reduced since the pump will not be unnecessarily driven up to its maximum pressure output.

It should be appreciated that, in several embodiments, the various system components and fluid lines described herein may generally be utilized to form a hydraulic circuit that provides for improved hydraulic efficiencies and reduced heat generation. As such, the individual system components and fluid lines may generally be installed and/or positioned relative to one another on the work vehicle and/or its associated implement in any suitable manner that allows for the formation of such hydraulic circuit. Specifically, in one embodiment, the various system components and fluid lines may be assembled such that the downstream pressure control is performed on the implement. For instance, the pressure control device and associated fluid lines may be incorporated into an implement valve block or casing installed on the implement. Alternatively, the various system components and fluid lines may be assembled such that the downstream pressure control is performed on the work vehicle as opposed to on the implement. For example, the pressure control device and its associated fluid lines may be incorporated into a vehicle valve block or casing along with various other system components and/or fluid lines. In such an embodiment, the vehicle valve block may be installed on the work vehicle in any suitable manner, such as by replacing an existing valve block of the work vehicle or by installing the valve block as a modular component onto an existing sectional valve stack.

Referring now to the drawings, FIG. 1 illustrates a side view of one embodiment of a work vehicle 10 towing an implement 12 in accordance with aspects of the present subject matter. As shown, the work vehicle 10 is configured as an agricultural tractor. However, in other embodiments, the work vehicle 10 may be configured as any other suitable work vehicle known in the art that is configured to tow an implement, such as various other agricultural vehicles and/or the like.

As shown in FIG. 1, the work vehicle 10 includes a pair of front wheels 14, a pair or rear wheels 16 and a chassis 18 coupled to and supported by the wheels 14, 16. An operator's cab 20 may be supported by a portion of the chassis 18 and may house various control devices (e.g., levers, pedals, control panels and/or the like) for permitting an operator to control the operation of the work vehicle 10 and/or the implement 12. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train of the work vehicle 10.

The work vehicle 10 may also include one or more auxiliary systems coupled to the engine 22. For example, as shown in FIG. 1, the work vehicle 10 may include a vehicle hydraulic system 30 that serves to provide a source of pressurized hydraulic fluid for powering various hydraulic components (e.g., actuators, motors, etc.) used for controlling the operation of the implement 12 and/or other detachable equipment. In several embodiments, the hydraulic system 30 may include one or more valves or valve blocks for controlling the flow of hydraulic fluid supplied to the implement 12 (e.g., via hydraulic lines 32).

As shown in FIG. 1, the implement 12 corresponds to a planter configured to be towed behind the work vehicle 10 across the ground 34. In several embodiments, the implement 12 may include a frame 36 and a plurality of planter units 38 coupled to and supported by the frame 36. As is generally understood, the planter units 38 may be configured to deposit seeds and/or fertilizer at a desired depth beneath the soil surface, thereby establishing rows of planted seeds. As such, each planter unit 38 may include one or more ground-engaging tools or components configured to engage or otherwise contact the ground 34. For example, in one embodiment, each planter unit 38 may include a pair of laterally spaced opener discs 40, a pair of laterally spaced furrow closer discs 42 and a press wheel 44. Seeds, fertilizer and/or other agricultural material may be supplied to each planter unit 38 via an individual hopper 46 and/or a bulk-fill hopper 48.

Additionally, the implement 12 may include an implement hydraulic system 50 configured to receive hydraulic fluid from the vehicle hydraulic system 30 (e.g., via lines 32) and supply such fluid to any number of hydraulic components associated with the implement 12. For example, in one embodiment, the implement 12 may include a plurality of hydraulic cylinders configured to raise and lower one or more of the ground-engaging components of the planter units 38 relative to the ground 34. In such instance, the hydraulic fluid received from the vehicle hydraulic system 30 may be distributed to the various cylinders via the implement hydraulic system 50. In addition, the implement 12 may include various other hydraulic components configured to receive hydraulic fluid, such as one or more hydraulic motors that may be used to drive a fan and/or seed drive of the implement 12 and/or that may be used to adjust the implement 12 to a transport configuration (e.g., by folding in wing sections of the frame 36).

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of tires.

It should also be appreciated that the configuration of the implement 12 described above and shown in FIG. 1 is only provided for exemplary purposes. Thus, it should be appreciated that the present subject matter may be readily adaptable to any manner of implement configuration. Specifically, the implement 12 may generally correspond to any suitable type of implement that is configured to receive hydraulic fluid from the work vehicle 10 in order to operate one or more hydraulic components associated with the implement 12. As will be described below, the disclosed system may be particularly advantageous for use with implements including hydraulic components that require some form of pressure control, such as planters, seeders and/or other suitable hydraulics-equipped implements that are configured to operate in a constant or automatic down pressure mode.

Figure 2:
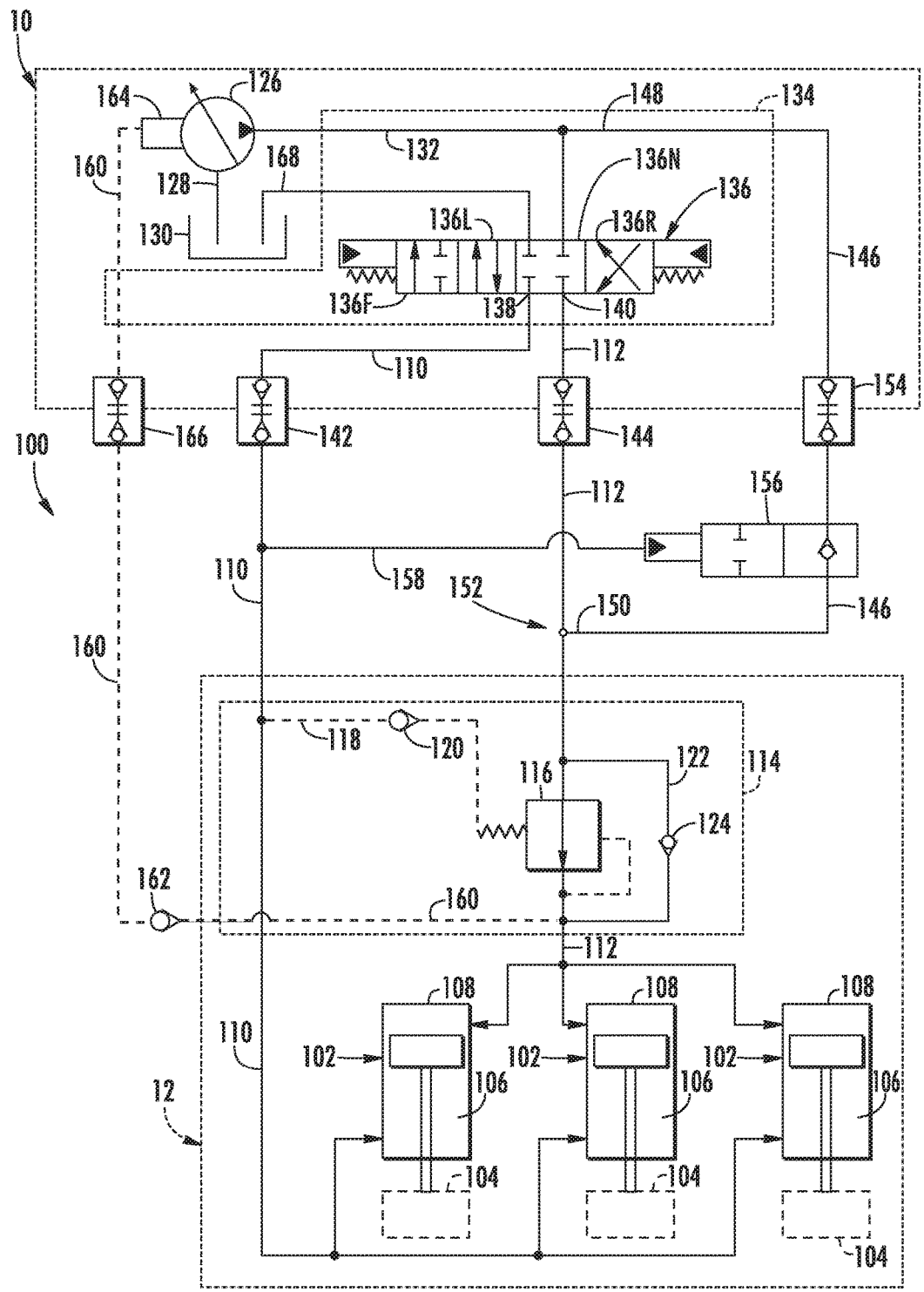
FIG. 2 illustrates a simplified, schematic view of one embodiment of a system for controlling the supply of hydraulic fluid to a work vehicle implement in accordance with aspects of the present subject matter.

Referring now to FIG. 2, a schematic view of one embodiment of a system 100 for controlling the supply of hydraulic fluid to a work vehicle implement is illustrated in accordance with aspects of the present subject matter. In general, the system 100 will be described herein with reference to the work vehicle 10 and the implement 12 described above with reference to FIG. 1. However, it should be appreciated that, in general, the system 100 may be utilized with any suitable work vehicles and/or implements.

As shown in FIG. 2, the system 100 may include a plurality of hydraulic cylinders 102 located on the implement 12. In several embodiments, the hydraulic cylinders 102 may be used to raise and lower one or more ground-engaging components (indicated by dashed boxes 104 in FIG. 2) of the implement 12 relative to the ground, such as the opener discs 40, closer discs 42 and/or press wheel 44 described above. As shown in the illustrated embodiment, each cylinder 102 may include a rod-side or first chamber 106 and a piston-side or second chamber 108, with the first chamber 106 being fluidly coupled to a first fluid line 110 of the system 100 and the second chamber 108 being fluidly coupled to a second fluid line 112 of the system 100. As will be described below, hydraulic fluid may be supplied to the first chamber 106 of each cylinder 102 via the first fluid line 110 to allow the ground engaging component(s) 104 of the implement 12 to be raised relative to the ground. Similarly, hydraulic fluid may be supplied to the second chamber 108 of each cylinder 102 via the second fluid line 112 to allow the ground-engaging component(s) 104 to be lowered relative to the ground. Moreover, in accordance with aspects of the present subject matter, when the implement 12 is operating in a constant down pressure mode, the pressure of the hydraulic fluid supplied to the second chamber 108 of each cylinder 102 may be maintained substantially constant to allow the ground-engaging component(s) 104 to apply a substantially constant down pressure against the ground or furrow.

Additionally, the system 100 may include an implement valve casing or block 114 located on the implement 12 that is provided in flow communication with the first and second fluid lines 110, 112. As shown in FIG. 2, the implement valve block 114 may include a pressure control valve 116 configured to regulate the pressure of the hydraulic fluid being supplied to the second chamber 108 of each cylinder 102 via the second fluid line 112. In several embodiments, the pressure control valve 116 may correspond to an adjustable pressure regulating valve configured to maintain the pressure of the hydraulic fluid supplied to the second chamber 108 of each cylinder 102 at a substantially constant pressure. For example, the pressure control valve 116 may be manually or electronically adjustable to allow an operator to select the fluid pressure to be supplied to the second chamber 108 of each cylinder 102. Such pressure may be selected by the operator, for instance, based on the field or soil conditions to allow the desired down pressure to be applied against the ground or furrow.

It should be appreciated that, as used herein, the pressure of the hydraulic fluid supplied to the second chamber 108 of each cylinder 102 is maintained "substantially constant" over a given period of time when the fluid pressure of the hydraulic fluid supplied to the second chamber 108 varies across such time period by less than +/−15%, such as less than +/−10%, or less than +/−5% or less +/−2%.

The implement valve block 114 may also incorporate various other components and/or fluid lines. For example, as shown in FIG. 2, a first return line 118 and associated check valve 120 may be provided between the pressure control valve 116 and the first fluid line 110. Similarly, a second return line 122 and associated check valve 124 may be provided in association with the second fluid line 112 to allow hydraulic fluid to bypass the pressure control valve 116 when flowing out of the second chamber 108 of each cylinder 102.

Moreover, as shown in FIG. 2, the system 100 may include a pump 126 located on the work vehicle 10 that is configured to receive hydraulic fluid via a pump input line 128 from a fluid source (e.g., tank 130) and pressurize such fluid for output via a pump output line 132 to one more system components. As shown in the illustrated embodiment, a vehicle valve casing or block 134 may be provided in flow communication with the pump output line 132. In several embodiments, the vehicle valve block 134 may be located on the work vehicle 10 and may include a control valve 136 configured to selectively regulate the supply of hydraulic fluid flowing between the pump 126 and the first and second fluid lines 110, 112. For example, as shown in FIG. 2, a first output port 138 of the control valve 136 may be provided in flow communication with the first fluid line 110 and a second output port 140 of the control valve 136 may be provided in flow communication with the second fluid line 112.

As used herein, the term "first fluid line" generally refers to the flow path defined between the first outlet port 138 of the control valve 136 and the first chamber 106 of each cylinder 102. Thus, it should be appreciated that the first fluid line 110 may be formed from a single fluid conduit or multiple fluid conduits coupled to one another to form the desired fluid path. For instance, as shown in FIG. 2, a first quick connect coupler 142 may be provided to allow separate portions of the first fluid line 110 to be coupled together to form a continuous flow path.

Similarly, as used herein, the term "second fluid line" generally refers to the flow path defined between the second outlet port 140 of the control valve 136 and the second chamber 108 of each cylinder 102. Thus, it should be appreciated that the second fluid line 112 may be formed from a single fluid conduit or multiple fluid conduits coupled to one another to form the desired fluid path. For instance, as shown in FIG. 2, a second quick connect coupler 144 may be provided to allow separate portions of the second fluid line 110 to be coupled together to form a continuous flow path. Moreover, separate portions of the second fluid line 112 may be coupled together via the pressure control value 116 to form a continuous flow path along such fluid line 112.

Additionally, in accordance with aspects of the present subject matter, the system 100 may include a bypass fluid line 146 configured to provide a flow path for the pressurized fluid output from the pump 126 that bypasses the control valve 136. For example, as shown in FIG. 2, the bypass fluid line 146 may include a first end 148 coupled to the pump output line 132 and a second end 150 coupled to a portion of the second fluid line 112 extending between the control valve 136 and the pressure control valve 116 (e.g., at location 152). As such, the bypass fluid line 146 may provide a flow path for the hydraulic fluid directed between the pump output line 132 and the pressure control valve 116 that is independent of the control valve 136.

Moreover, as shown in FIG. 2, the system 100 may include a bypass valve 156 provided in flow communication with the bypass fluid line 146. In general, the bypass valve 156 may be configured to close or cut-off the flow path formed by the bypass fluid line 146 when hydraulic fluid is being directed along the first fluid line 110 between the pump 126 and the first chamber 106 of each cylinder 102 to allow the ground-engaging component(s) 104 to be raised relative to the ground. As shown in FIG. 2, in one embodiment, the bypass valve 156 may correspond to a pilot-operated check valve fluidly coupled to the first fluid line 110 via a pilot line 158. In such an embodiment, when high pressure fluid is being supplied through the first fluid line 110, a portion of the fluid may be directed through the pilot line 158 to the bypass valve 156 to close the valve, thereby cutting-off the flow of hydraulic fluid through the bypass fluid line 146. Alternatively, the bypass valve 156 may correspond to any other suitable valve or valve-like device. For instance, in an alternative embodiment, the bypass valve 156 may correspond to an electronically controlled shut-off valve that is configured to be automatically closed (e.g., via a suitable controller) when the ground-engaging component(s) 104 is being raised relative to the ground.

As used herein, the term "bypass fluid line" generally refers to the flow path defined between the pump 126 and the second fluid line 112 that bypasses the control valve 136. Thus, it should be appreciated that the bypass fluid line 146 may be formed from a single fluid conduit or multiple fluid conduits coupled to one another to form the desired fluid path. For instance, as shown in FIG. 2, a third quick connect coupler 154 may be provided to allow separate portions of the bypass fluid line 146 to be coupled together to form a continuous flow path. Moreover, separate portions of the bypass fluid line 146 may be coupled together via the bypass valve 156 to form a continuous flow path along such fluid line 146.

Referring still to FIG. 2, the system 100 may also include a load sensing line 160 configured to provide an indication of the fluid pressure of the hydraulic fluid being supplied to the second chamber 108 of each cylinder 102 from the pressure control valve 116. For example, as shown in the illustrated embodiment, the load sensing line 160 may be coupled to a portion of the second fluid line 112 extending between the pressure control valve 116 and the cylinders 102. As such, when pressurized fluid is being supplied from the pressure control valve 116 to the second chamber 108 of each cylinder 102 via the second fluid line 112, a small portion of the hydraulic fluid may be diverted through the load sensing line 160 to provide feedback associated with the output pressure of the pressure control valve 116. Additionally, as shown in FIG. 2, a check valve 162 may be provided in association with the load sensing line 160 to prevent low pressure fluid from being directed through a portion of the line 160 (e.g., when fluid is being returned to the tank 130 from the second chamber 108 of each cylinder 102).

In several embodiments, the pressure feedback provided via the load sensing line 160 may be used to control the operation of the pump 126. Specifically, if the output pressure of the pressure control valve 116 corresponds to the maximum pressure at which hydraulic fluid is to be supplied from the pump 126 (as compared to the required pressure loads for any other hydraulic-based components being supplied via the pump 126), the output pressure of the pump 126 may be selected based on the output pressure of the pressure control valve 116. For example, the output pressure of the pump 126 may be selected so as to correspond to the output pressure of the pressure control valve 116 plus a predetermined pressure margin.

As shown in FIG. 2, in one embodiment, the pressurized fluid directed through the load sensing line 160 may be supplied to a load sensing circuit or controller 164 of the pump 126. In one embodiment the load sensing controller 164 may be configured to hydraulically control the operation of the pump 126 based on the pressure feedback received via the load sensing line 160. For example, the load sensing controller 164 may be equipped to detect a pressure differential between the output pressure of the pump 126 and the output pressure of the pressure control valve 116. Based on the pressure differential, the controller 164 may adjust the operation of the pump, as necessary, to ensure that the output pressure of the pump 126 is maintained at the desired level.

It should be appreciated that, as an alternative to a hydraulics-based controller, the controller 164 may correspond to an electronic, processor-based device. In such an embodiment, the load sensing line 160 may be provided in flow communication with a pressure sensor (not shown) that is communicatively coupled to the electronic controller. In such an embodiment, the controller 164 may be configured to electronically control the operation of the pump 126 based on the pressure measurements received from the pressure sensor.

As used herein, the term "load sensing line" generally refers to the flow path defined between the second fluid line 112 (i.e., at a location along the portion of the fluid line 112 extending between the pressure control valve 116 and the cylinders 102) and the pump 126 (or pressure sensor). Thus, it should be appreciated that the load sensing line 160 may be formed from a single fluid conduit or multiple fluid conduits coupled to one another to form the desired fluid path. For instance, as shown in FIG. 2, a fourth quick connect coupler 166 may be provided to allow separate portions of the load sensing line 160 to be coupled together to form a continuous flow path. Additionally, separate portions of the load sensing line 160 may be coupled together via the check valve 162 to form a continuous flow path along such fluid line 160.

During operation of the system 100, the control valve 136 may be actuated between a plurality of positions to allow the ground-engaging component(s) 104 of the implement 112 to be raised and lowered as well as to allow the implement 112 to be operated in a constant down pressure mode. For example, the control valve 136 may be moved to a raise position (indicated by box 136R) to allow the ground-engaging component(s) 104 to be raised relative to the ground. Specifically, at the raise position 136R, hydraulic fluid supplied from the pump 126 may be output from the control valve 136 via the first output port 138 and directed through the first fluid line 110 to the first chamber 106 of each cylinder 102, thereby allowing the ground-engaging component(s) 104 to be raised relative to the ground. In addition, as indicated above, a portion of the hydraulic fluid directed through the first fluid line 110 may, in one embodiment, be supplied to the bypass valve 156 (e.g., via the pilot line 158) to close the valve 156 and cut-off the flow of fluid through the bypass fluid line 146. Moreover, when the control valve 136 is at the raise position 136R, hydraulic fluid contained within the second chamber 108 of each cylinder 102 may be directed back through the control valve 136 via the second fluid line 112 and the second return line 122 to allow such fluid to be returned to the tank 130 via a tank return line 168.

Similarly, when lowering the ground-engaging component(s) 104 of the implement 12, the control valve 136 may be moved to a lower position (indicated by box 136L). Specifically, at the lower position 136L, hydraulic fluid supplied from the pump 126 may be output from the control valve 136 via the second output port 140 and directed through the second fluid line 112 (and the pressure control valve 116) to the second chamber 108 of each cylinder 102, thereby allowing the ground-engaging component(s) 104 to be lowered relative to the ground. Additionally, when at the lower position 136L, the control valve 136 may cut-off the flow path defined between the pump 126 and the first fluid line 110, thereby opening the bypass valve 156 and allowing fluid to flow through the bypass fluid line 146. This bypass flow may be combined with the fluid flow output from the control valve 136 (e.g., at location 152) for delivery to the second chamber 108 of each cylinder 102. Moreover, when the control valve 136 is at the lower position 136L, hydraulic fluid contained within the first chamber 106 of each cylinder 102 may be directed back through the control valve 136 via the first fluid line 110 to allow such fluid to be returned to the tank 130 via the tank return line 168.

Furthermore, when it is desired to operate the implement 12 in a constant down pressure mode, the control valve 136 may be moved to a modified float position (indicated by box 136F) such that supply of pressurized fluid directed through the control valve 136 from the pump 126 is cut-off. In such an operating mode, the supply of fluid directed through the second fluid line 112 to the second chamber 108 of each cylinder 102 may derive solely from the bypass fluid line 146. Specifically, fluid from the pump 126 may be directed through the bypass fluid line 146 to the pressure control valve 116, which may be used to adjust the pressure of the fluid to a suitable output pressure selected by the operator. The fluid may then be directed to the second chamber 108 of each cylinder 102 to allow a substantially constant down pressure to be applied by the ground-engaging component(s) 104 of the implement 12. Additionally, hydraulic fluid contained within the first chamber 106 of each cylinder 102 may be directed back through the control valve 136 via the first fluid line 110 to allow such fluid to be returned to the tank 130 via the tank return line 168. Moreover, in the event that the output pressure of the pressure control valve 116 exceeds the operator-selected value, the flow path through the pressure control valve 116 may be adjusted to allow a portion of the fluid contained within the second chamber 108 of each cylinder 102 to be directed through the first return line 118 (and the corresponding check valve 120) to the first fluid line 110 for delivery back to the fluid tank 130.

It should be appreciated that the control valve 136 may be movable to any other suitable position. For example, as shown in FIG. 2, the control valve 136 may be moved to a neutral position (indicated by box 136N) such that the supply of fluid directed through the control valve 136 is completely cut-off.

Figure 3:
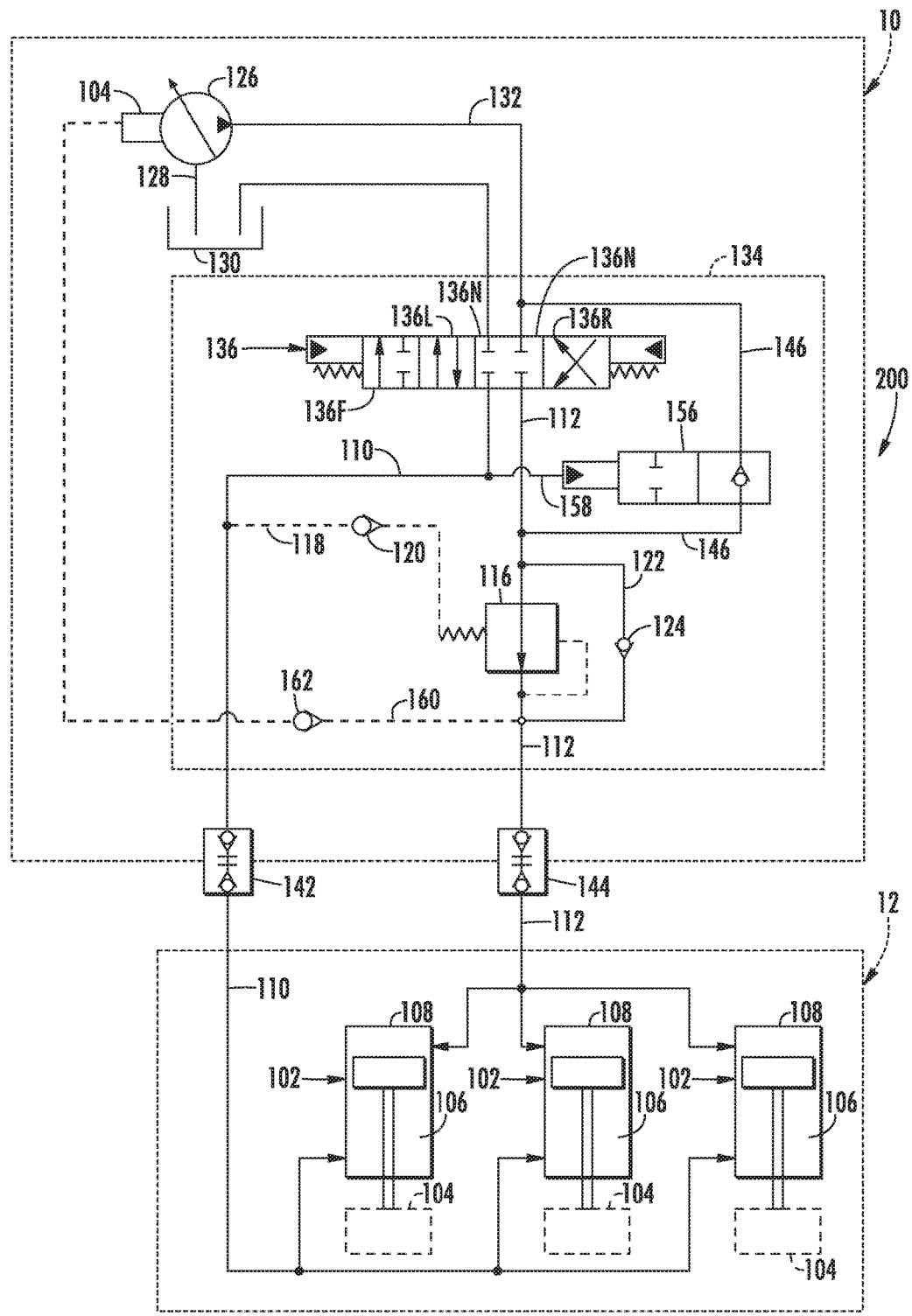
FIG. 3 illustrates a simplified, schematic view of another embodiment of a system for controlling the supply of hydraulic fluid to a work vehicle implement in accordance with aspects of the present subject matter.

Referring now to FIG. 3, a simplified, schematic view of another embodiment of a system 200 for controlling the supply of hydraulic fluid to a work vehicle implement is illustrated in accordance with aspects of the present subject matter. In general, the system 200 may be configured similar to the system 100 described above with reference to FIG. 2 and, thus, may include all or a significant portion of the components and fluid lines described above. For example, as shown in FIG. 3, the system 200 may include a pump 126, a control valve 136, a bypass valve 156, a pressure control valve 116 and various check valves 120, 124, 162. Additionally, the system 200 may include a first fluid line 110 extending between the control valve 136 and a first chamber 106 of each hydraulic cylinder 102 and a second fluid line 112 extending between the control valve 136 and a second chamber 108 of each hydraulic cylinder 102. Moreover, the system 200 may include a bypass line 146 configured to provide a bypass flow path between the pump 126 and the second fluid line 112 that is independent of the control valve 136, a load sensing line 160 configured to provide an indication of the fluid pressure of the hydraulic fluid discharged from the pressure control valve 116 and various secondary lines (e.g., first and second return lines 118, 122 and a pilot line 158).

However, unlike the embodiment shown in FIG. 2, the system 200 includes a valve casing or block 134 located on the work vehicle 10 that is configured to incorporate or otherwise include many of the system components and fluid lines. For example, as shown in FIG. 3, the control valve 136, the bypass line 146 and the bypass valve 156 may all be incorporated within the vehicle valve block 134. In addition, as opposed to be located on the implement 12 (e.g., within the implement valve block 114 shown in FIG. 2), the pressure control valve 116, the check valves 118, 124, 162 and the various secondary lines 118, 122, 158 may also be incorporated into the vehicle valve block 134. Moreover, as shown in FIG. 3, a portion or section of the load sensing line 160 may be incorporated into the valve block 134.

Such compartmentalizing of the system components and fluid lines may generally reduce the overall complexity of the system 200. For example, as shown in FIG. 3, in contrast to the four quick connector couplers 142, 144, 154, 166 described above with reference to FIG. 2, the system 200 may only include two quick connect couplers 142, 144 for coupling the vehicle-side components to the implement-side components. Specifically, as shown in the illustrated embodiment, a first quick connect coupler 142 may be configured to couple the portion of the first fluid line 110 extending between the control valve 136 and the coupler 142 to the portion of the first fluid line 110 extending between the coupler 142 and the first chamber 106 of each cylinder 102. Similarly, a second quick connect coupler 144 may be configured to couple the portion of the second fluid line 112 extending between the control valve 136 and the coupler 144 to the portion of the second fluid line 112 extending between the coupler 144 and the second chamber 108 of each cylinder 102.

It should be appreciated that, in other embodiments, any other suitable combination of the system components and/or fluid lines may be incorporated into the vehicle valve block 134. For instance, in one embodiment, the bypass line 146 and the bypass valve 156 may be incorporated within the vehicle valve block 134 in addition to the control valve 136. In such an embodiment, the pressure control valve 116, the check valves 120, 124, 162, the associated secondary lines 118, 122 and a portion of the load sensing line 160 may, for example, be maintained on the implement 12 (e.g., similar to the embodiment shown in FIG. 2).

It should be appreciated that the various components and fluid lines shown in FIG. 3 may generally be configured to perform the same or a similar function to the corresponding components and fluid lines described above with reference to FIG. 2. For instance, the pump 126 may be configured to receive hydraulic fluid via a pump input line 128 from a fluid source (e.g., tank 130) and pressurize such fluid for output via a pump output line 132 to both the control valve 136 and the bypass fluid line 146. Similarly, the control valve 136 may be configured to selectively regulate the supply of hydraulic fluid flowing through the first and second fluid lines 110, 112 to the first and second chambers 106, 108, respectively, of each hydraulic cylinder 102 (e.g., by adjusting the position of the valve 136 between its raise position 136R, its lower position 136L and its modified float position 136F). For example, when at the raise position 136R, the valve 136 may provide a flow path between the pump 126 and the first fluid line 110 for directing fluid to the first chamber 106 of each hydraulic cylinder 102 (and, optionally, to the bypass valve 156 via the pilot line 158 to cut-off the flow of fluid through the bypass fluid line 146), thereby allowing the ground-engaging component(s) 104 of the implement 12 to be raised relative to the ground. Similarly, when at the lower position 136L, the valve 136 may provide a flow path between the pump 126 and the second fluid line 112 for directing fluid to the second chamber 108 of each hydraulic cylinder 102, thereby allowing the ground-engaging component(s) 104 to be lowered relative to the ground.

Moreover, when at the modified float position 136F, the valve 136 may cut-off the flow path defined between the pump 126 and the second fluid line 112 such that hydraulic fluid is supplied between the pump 126 and the pressure control valve 116 solely through the bypass fluid line 146, which may allow the implement 12 to be operated in its constant down pressure mode. For example, the operator may adjust the settings of the pressure control valve 116 to select the fluid pressure to be supplied to the second chamber 108 of each cylinder 102. The pressure control valve 116 may then be configured to maintain the fluid pressure of the hydraulic fluid being supplied to the second chamber 108 of each cylinder 102 at the operator-selected pressure.

Additionally, similar to that described above, the load sensing line 160 may be configured to provide an indication of the fluid pressure of the hydraulic fluid being supplied to the second chamber 108 of each cylinder 102 from the pressure control valve 116. The pressure feedback provided via the load sensing line 160 may then be used to control the operation of the pump 126. For example, as shown in FIG. 3, the pressurized fluid directed through the load sensing line 160 may be supplied to a load sensing circuit or controller 164 of the pump 126, which may be configured to control the operation of the pump 126 based on the pressure feedback.

Figure 4:
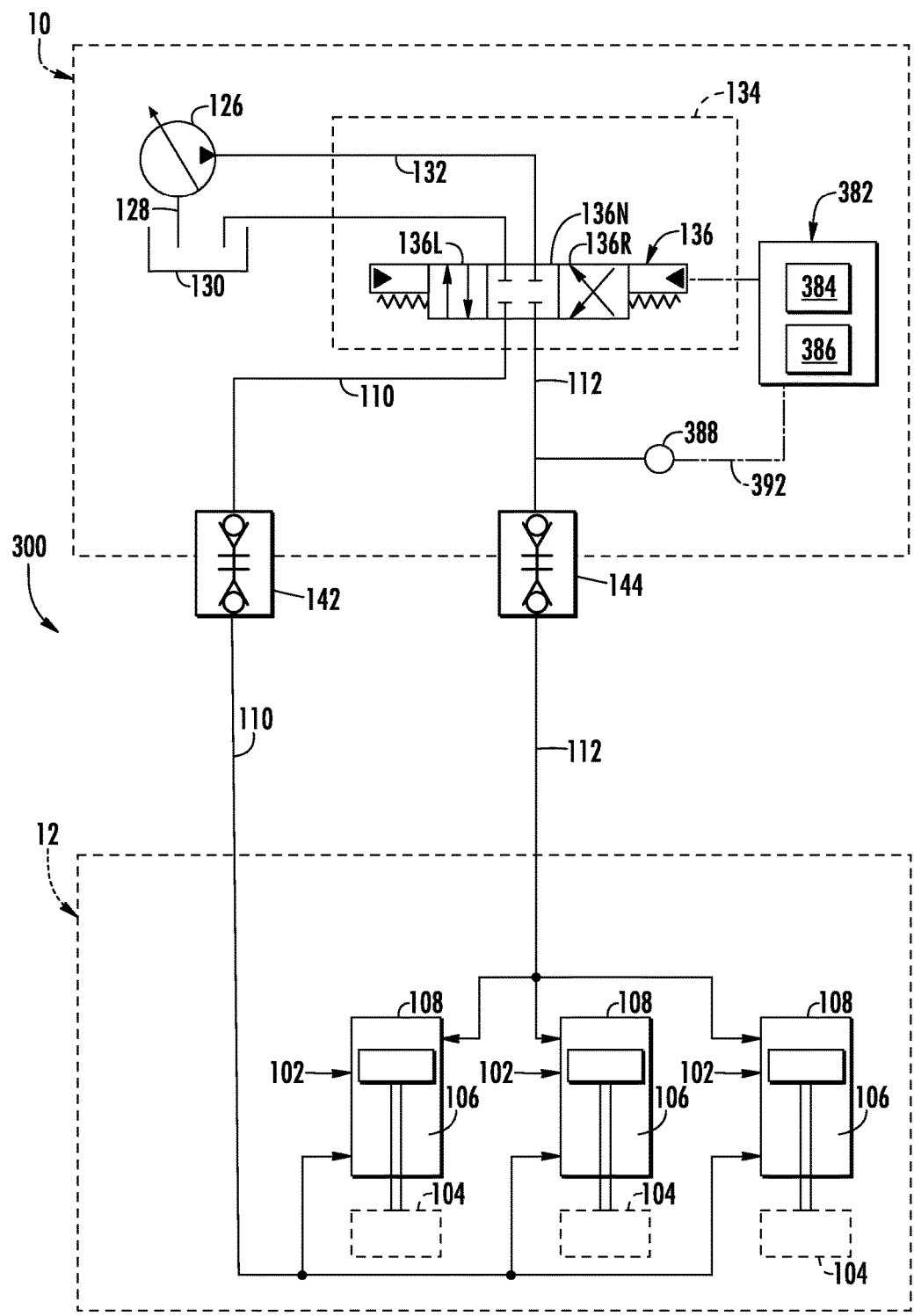
FIG. 4 illustrates a simplified, schematic view of a further embodiment of a system for controlling the supply of hydraulic fluid to a work vehicle implement in accordance with aspects of the present subject matter.

Referring now to FIG. 4, a simplified, schematic view of yet another embodiment of a system 300 for controlling the supply of hydraulic fluid to a work vehicle implement is illustrated in accordance with aspects of the present subject matter. In general, the system 300 may be configured similar to the systems 100, 200 described above with reference to FIGS. 2 and 3 and, thus, may include all or a significant portion of the components and fluid lines described above. For example, as shown in FIG. 4, the system 300 may include a pump 126, a vehicle valve block 134 including a control valve 136 and first and second quick connect couplers 142, 144. Additionally, the system 300 may include a first fluid line 110 extending between the control valve 136 and a first chamber 106 of each hydraulic cylinder 102 and a second fluid line 112 extending between the control valve 136 and a second chamber 108 of each hydraulic cylinder 102.

It should be appreciated that the various components and fluid lines shown in FIG. 4 may generally be configured to perform the same or a similar function to the corresponding components and fluid lines described above with reference to FIGS. 2 and 3. For instance, the pump 126 may be configured to receive hydraulic fluid via a pump input line 128 from a fluid source (e.g., tank 130) and pressurize such fluid for output via a pump output line 132 to the control valve 136. Similarly, the control valve 136 may be configured to selectively regulate the supply of hydraulic fluid flowing through the first and second fluid lines 110, 112 to the first and second chambers 106, 108, respectively, of each hydraulic cylinder 102 (e.g., by adjusting the position of the valve 136 between its raise position 136R and its lower position 136L). For example, when at the raise position 136R, the valve 136 may provide a flow path between the pump 126 and the first fluid line 110 for directing fluid to the first chamber 106 of each hydraulic cylinder 102, thereby allowing the ground-engaging component(s) 104 of the implement 12 to be raised relative to the ground. Similarly, when at the lower position 136L, the valve 136 may provide a flow path between the pump 126 and the second fluid line 112 for directing fluid to the second chamber 108 of each hydraulic cylinder 102, thereby allowing the ground-engaging component(s) 104 to be lowered relative to the ground.

Additionally, as shown in FIG. 4, the system 300 may also include a controller 382 configured to electronically control the operation of the control valve 136. In general, the controller 382 may correspond to any suitable processor-based device known in the art, such as a computing device or any suitable combination of computing devices. Thus, in several embodiments, the controller 382 may include one or more processor(s) 384 and associated memory device(s) 386 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 386 of the controller 382 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 386 may generally be configured to store suitable computer-readable instructions that, when implemented by the processor(s) 384, configure the controller 382 to perform various computer-implemented functions, such as by actively controlling the operation of the control valve 136 based on sensed pressures. In addition, the controller 382 may also include various other suitable components, such as a communications circuit or module, one or more input/output channels, a data/control bus and/or the like.

It should be appreciated that the controller 382 may correspond to an existing controller of the work vehicle 10 or the controller 382 may correspond to a separate processing device. For instance, in one embodiment, the controller 382 may form all or part of a separate plug-in module that may be installed within the work vehicle 10 to allow for the disclosed system to be implemented without requiring additional software to be uploaded onto existing control devices of the vehicle 10.

In several embodiments, the controller 382 may be communicatively coupled to one or more pressure sensors 388 for monitoring the fluid pressure of the hydraulic fluid supplied through the second fluid line 112. For example, as shown in FIG. 4, the system 300 may include a pressure sensor 388 coupled to the controller 382 (e.g., via a communicative link 392) that is configured to sense the fluid pressure of the hydraulic fluid being supplied along the portion of the second fluid line 112 extending between the control valve 136 and the second chamber 108 of each hydraulic cylinder 102. As such, by receiving measurement signals from the pressure sensor 388, the controller may be configured to monitor the input pressure of the hydraulic fluid supplied to the second chamber 108 of each hydraulic cylinder 102. It should be appreciated that the pressure sensor 388 may be in fluid communication with the second fluid line 112 at any suitable location downstream of the control valve 136. For example, as shown in the illustrated embodiment, the pressure sensor 388 is located on the vehicle-side of the second fluid line 112. However, in other embodiments, the pressure sensor 388 may be located on the implement-side of the second fluid line 112.

Based on the monitored system pressure(s), the controller 382 may be configured to actively control the operation of the control valve 136 so as to adjust the pressure of the hydraulic fluid being supplied through the second supply line 112 to the cylinders 102. Such active pressure control may be particularly advantageous when it is desired to operate the implement 12 within its constant down pressure mode. For example, the operator may be allowed to select a desired fluid pressure for the hydraulic fluid being supplied to the second chamber 108 of each cylinder 102, such as by allowing the operator to input the pressure setting into the controller 382 (e.g., via a suitable input device located within the cab). The operator-provided pressure setting may then be stored within the memory 386 of the controller 382. Thereafter, based on the pressure feedback provided from the sensor 388, the controller 382 may be configured to actively adjust the operation of the control valve 136, as needed, to ensure that the input pressure of the fluid supplied to the cylinders 102 is equal to or greater than the operator-selected pressure setting. For instance, in one embodiment, the controller 382 may control the operation of the control valve 136 such that the input pressure supplied to the cylinders 102 is equal to the operator-selected pressure setting plus a predetermined pressure margin.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling the supply of hydraulic fluid to an implement of a work vehicle, the implement including a hydraulic cylinder having a first chamber and a second chamber, the system comprising:
  a pump configured to provide hydraulic fluid under pressure through a pump output line;
  a control valve in flow communication with the pump output line, the control valve being configured to regulate a supply of hydraulic fluid to the hydraulic cylinder, wherein the control valve is adjustable between a raise position, a lower position and a modified float position;
  a first fluid line provided in flow communication with a first output port of the control valve, the control valve being configured to supply hydraulic fluid through the first fluid line to the first chamber of the hydraulic cylinder for raising at least one ground-engaging component of the implement relative to the ground;
  a second fluid line provided in flow communication with a second output port of the control valve, the control valve being configured to supply hydraulic fluid through the second fluid line to the second chamber of the hydraulic cylinder for lowering the at least one ground-engaging component relative to the ground;
  a pressure control valve provided in flow communication with the second fluid line, the pressure control valve being configured to regulate a fluid pressure of the hydraulic fluid being supplied to the second chamber of the hydraulic cylinder;
  a bypass fluid line configured to provide a flow path for hydraulic fluid between the pump and the second fluid line that is independent of the control valve; and
  a load sensing line configured to provide an indication of the fluid pressure of the hydraulic fluid being supplied to the second chamber of the hydraulic cylinder from the pressure control valve, wherein the load sensing line is coupled between a load sensing controller of the pump and a portion of the second fluid line extending between the pressure control valve and the second chamber of the hydraulic piston, the load sensing controller being configured to adjust an output pressure of the pump,
  wherein, when hydraulic fluid is being supplied through the pressure control valve from the pump, operation of the pump is configured to be controlled based at least in part on the fluid pressure of the hydraulic fluid being supplied to the second chamber of the hydraulic cylinder, and
  wherein, when in the control valve is in the modified float position, hydraulic fluid is directed between the pump and the pressure control valve via the bypass fluid line, the pressure control valve being configured to maintain the fluid pressure of the hydraulic fluid supplied to the second chamber of the hydraulic cylinder substantially constant based on an operator-selected pressure value.

2. The system of claim 1, further comprising a bypass valve provided in flow communication with the bypass fluid line, the bypass valve being configured to cut-off the flow path defined by the bypass fluid line when hydraulic fluid is being supplied from the control valve through the first fluid line to raise the at least one ground-engaging component relative to the ground.

3. The system of claim 2, wherein the bypass valve is a pilot-operated check valve, the first fluid line being fluidly coupled to the pilot-operated valve such that the pilot-operated check valve is closed when hydraulic fluid is being supplied from the control valve through the first fluid line to raise the at least one ground-engaging component relative to the ground.

4. The system of claim 2, wherein the control valve is included within a valve block located on the work vehicle, wherein at least one of the pressure control valve or the bypass valve is included within the valve block.

5. The system of claim 2, wherein the control valve is included within a valve block located on the work vehicle, wherein the bypass valve is positioned exterior to the valve block and the pressure control valve is located on the implement.

6. The system of claim 1, wherein the control valve is configured to provide a flow path between the pump and the first fluid line when in the raise position and a flow path between the pump and the second fluid line when in the lower position, the control valve being configured to cut-off the supply of fluid from the pump to the first and second fluid lines when in the modified float position.

7. The system of claim 1, wherein the first fluid line defines a flow path between the first outlet port of the control valve and the first chamber of the hydraulic cylinder and wherein the second fluid line defines a flow path between the second outlet port of the control valve and the second chamber of the hydraulic cylinder, wherein the bypass fluid line includes a first end in flow communication with the pump outlet line and a second end in flow communication with a portion of the second fluid line extending between the control valve and the pressure control valve.

8. A system for controlling the supply of hydraulic fluid to an implement of a work vehicle, the implement including a hydraulic cylinder having a first chamber and a second chamber, the system comprising:
  a pump configured to provide hydraulic fluid under pressure through a pump output line;
  a control valve in flow communication with the pump output line, the control valve being configured to regulate a supply of hydraulic fluid to the hydraulic cylinder, wherein the control valve is adjustable between a raise position, a lower position and a modified float position;
  a first fluid line provided in flow communication with a first output port of the control valve, the control valve being configured supply hydraulic fluid through the first fluid line to the first chamber of the hydraulic cylinder for raising at least one ground-engaging component of the implement relative to the ground;
  a second fluid line provided in flow communication with a second output port of the control valve, the control valve being configured to supply hydraulic fluid through the second fluid line to the second chamber of the hydraulic cylinder for lowering the at least one ground-engaging component relative to the ground;
  a pressure control valve provided in flow communication with the second fluid line, the pressure control valve being configured to regulate a fluid pressure of the hydraulic fluid being supplied to the second chamber of the hydraulic cylinder;
  a bypass fluid line configured to provide a flow path for hydraulic fluid between the pump and the second fluid line that is independent of the control valve;
  a bypass valve provided in flow communication with the bypass fluid line, the bypass valve being configured to cut-off the flow path defined by the bypass fluid line when hydraulic fluid is being supplied from the control valve through the first fluid line to raise the at least one ground-engaging component relative to the ground; and
  a load sensing line configured to provide an indication of the fluid pressure of the hydraulic fluid being supplied to the second chamber of the hydraulic cylinder from the pressure control valve, wherein, when hydraulic fluid is being supplied through the pressure control valve from the pump, operation of the pump is configured to be controlled based at least in part on the fluid pressure of the hydraulic fluid being supplied to the second chamber of the hydraulic cylinder, wherein the load sensing line is coupled between a load sensing controller of the pump and a portion of the second fluid line extending between the pressure control valve and the second chamber of the hydraulic piston, the load sensing controller being configured to adjust an output pressure of the pump;

wherein, when in the control valve is in the modified float position, hydraulic fluid is directed between the pump and the pressure control valve via the bypass fluid line, the pressure control valve being configured to maintain the fluid pressure of the hydraulic fluid supplied to the second chamber of the hydraulic cylinder substantially constant based on an operator-selected pressure value.

9. The system of claim 8, wherein the bypass valve is a pilot-operated check valve, the first fluid line being fluidly coupled to the pilot-operated valve such that the pilot-operated check valve is closed when hydraulic fluid is being supplied from the control valve through the first fluid line to raise the at least one ground-engaging component relative to the ground.

10. The system of claim 8, wherein the control valve is included within a valve block located on the work vehicle, wherein at least one of the pressure control valve or the bypass valve is included within the valve block.

11. The system of claim 8, wherein the control valve is included within a valve block located on the work vehicle, wherein the bypass valve is positioned exterior to the valve block and the pressure control valve is located on the implement.

12. The system of claim 8, wherein the control valve is configured to provide a flow path between the pump and the first fluid line when in the raise position and a flow path between the pump and the second fluid line when in the lower position, the control valve being configured to cut-off the supply of fluid from the pump to the first and second fluid lines when in the modified float position.

13. The system of claim 8, wherein the first fluid line defines a flow path between the first outlet port of the control valve and the first chamber of the hydraulic cylinder and wherein the second fluid line defines a flow path between the second outlet port of the control valve and the second chamber of the hydraulic cylinder, wherein the bypass fluid line includes a first end in flow communication with the pump outlet line and a second end in flow communication with a portion of the second fluid line extending between the control valve and the pressure control valve.

* * * * *